(12) United States Patent
Hayashi et al.

(10) Patent No.: US 11,637,526 B2
(45) Date of Patent: Apr. 25, 2023

(54) POWER GENERATION MODULE GROUP (71) Applicant: ZEON CORPORATION, Chiyoda-ku Tokyo (JP)

(72) Inventors: Yuki Hayashi, Tokyo (JP); Kiyoshige Kojima, Tokyo (JP); Masayoshi Yoshida, Tokyo (JP)

(73) Assignee: ZEON CORPORATION, Tokyo (JP)

(*) Notice: Subject to any disclaimer, the term of this patent is extended or adjusted under 35 U.S.C. 154(b) by 66 days.

(21) Appl. No.: 16/086,787

(22) PCT Filed: Jan. 19, 2017

(86) PCT No.: PCT/JP2017/001790
§ 371 (c)(1),
(2) Date: Sep. 20, 2018

(87) PCT Pub. No.: WO2017/168981
PCT Pub. Date: Oct. 5, 2017

(65) Prior Publication Data
US 2019/0115867 A1   Apr. 18, 2019

(30) Foreign Application Priority Data
Mar. 31, 2016 (JP) .............................. JP2016-070177

(51) Int. Cl.
*H02S 30/20* (2014.01)
*H02S 20/00* (2014.01)

(52) U.S. Cl.
CPC .............. *H02S 30/20* (2014.12); *H02S 20/00* (2013.01)

(58) Field of Classification Search
CPC ........... H02S 30/00; H02S 30/10; H02S 30/20
See application file for complete search history.

(56) References Cited

U.S. PATENT DOCUMENTS 6,008,448 A    12/1999 Peck
6,320,114 B1 * 11/2001 Kuechler .............. H01L 31/043
                                                      136/245
(Continued)

FOREIGN PATENT DOCUMENTS

EP    1422763 A1    5/2004
EP    1501132 A2    1/2005
(Continued)

OTHER PUBLICATIONS

Aug. 15, 2017, Notification of Reasons for Refusal issued by the Japan Patent Office in the corresponding Japanese Patent Application No. 2017-536603.

(Continued)

*Primary Examiner* — Edward J. Schmiedel
(74) *Attorney, Agent, or Firm* — Kenja IP Law PC (57) ABSTRACT

The power generation module group 1 includes a sheet 10 and power generation panels 21 to 24. First lines L1 and L1' are present between the panels 21 and 22 adjacent to each other in the lateral direction, the first lines crossing neither the panels 21 nor 22 and coming in contact with both the panels 21 and 22. The second line L2 is present on the bottom side of the panel 21 and on the bottom side of the panel 22, crosses neither the panels 21 nor 22 and is parallel in the lateral direction. An angle θ1 that is the largest angle on the panel 22 side of angles formed by the second line L2 and the first lines L1 and L1' is an acute angle. The panels 23 and 24 are disposed in line symmetry with the panels 21 and 22, respectively, with respect to the lateral direction.

9 Claims, 6 Drawing Sheets (56) References Cited

U.S. PATENT DOCUMENTS

| | | | |
|---|---|---|---|
| 9,190,857 B1 | 11/2015 | Lee | |
| 9,742,348 B2* | 8/2017 | Francis | H01L 31/0201 |
| 2004/0163699 A1 | 8/2004 | Boulanger | |
| 2006/0137733 A1* | 6/2006 | Schripsema | H01L 31/048 |
| | | | 136/246 |
| 2007/0012348 A1* | 1/2007 | Hoberman | A47B 3/087 |
| | | | 135/145 |
| 2008/0223431 A1* | 9/2008 | Chu | H02S 30/20 |
| | | | 136/245 |
| 2010/0156339 A1* | 6/2010 | Hoffman | H02S 10/40 |
| | | | 320/101 |
| 2011/0277748 A1* | 11/2011 | Chu | H02S 30/20 |
| | | | 126/627 |
| 2015/0075583 A1* | 3/2015 | Francis | H01L 31/0201 |
| | | | 136/245 |
| 2015/0083191 A1* | 3/2015 | Gmundner | H02S 30/20 |
| | | | 136/245 |

FOREIGN PATENT DOCUMENTS

| | | |
|---|---|---|
| FR | 2956774 A1 | 8/2011 |
| JP | S5833879 A | 2/1983 |
| JP | S60147150 A | 8/1985 |
| JP | H0244356 U | 3/1990 |
| JP | 2015088561 A | 5/2015 |
| WO | 2012167291 A2 | 12/2012 |
| WO | 2015100414 A1 | 7/2015 |
| WO | 2015179213 A2 | 11/2015 |

OTHER PUBLICATIONS

Mar. 21, 2017, International Search Report issued in the International Patent Application No. PCT/JP2017/001790.
Nov. 28, 2017, Decision to Grant a Patent issued by the Japan Patent Office in the corresponding Japanese Patent Application No. 2017-536603.
Feb. 20, 2019, the Supplementary European Search Report issued by the European Patent Office in the corresponding European Patent Application No. 17773531.3.
Oct. 2, 2018, International Preliminary Report on Patentability issued in the International Patent Application No. PCT/JP2017/001790.
Aug. 27, 2019, Communication pursuant to Article 94(3) EPC issued by the European Patent Office in the corresponding European Patent Application No. 17773531.3.
Mar. 31, 2020, Communication pursuant to Article 94(3) EPC issued by the European Patent Office in the corresponding European Patent Application No. 17773531.3.
Nov. 30, 2020, Communication pursuant to Article 94(3) EPC issued by the European Patent Office in the corresponding European Patent Application No. 17773531.3.

* cited by examiner

POWER GENERATION MODULE GROUP

TECHNICAL FIELD

The present disclosure relates to a power generation module group.

BACKGROUND

In recent years, there is a growing demand for portable power generation devices such that a user can use a mobile terminal such as a smart phone, a notebook PC (Personal Computer) and a tablet PC outside where a commercial power source cannot be obtained.

As one of the portable power generation devices, a foldable sheet-like power generation device is known. For example, PTL 1 discloses a sheet-like power generation device formed by disposing a plurality of solar cell modules on a sheet. In PTL 1, a groove of a predetermined depth is formed as a partition line in a sheet in a thickness direction thereof, and the sheet-like power generation device is folded by bending the sheet along the formed partition line.

CITATION LIST

Patent Literature

PTL 1: JP2015088561A

SUMMARY

Technical Problem

When a folding line such as the partition line as described in PTL 1 is formed in a sheet such that a sheet-like power generation device is folded, a load on the partition line increases when the sheet is folded. Further, when a folding line is formed as a groove of a predetermined depth, for example, in a sheet, a durability of the sheet itself decreases.

Thus, one objective of the present disclosure is to solve the aforementioned problem and to provide a power generation module group with a superior portability and durability.

Solution to Problem

The present disclosure aims to advantageously solve the aforementioned problem. The disclosed power generation module group is a power generation module group including a flexible sheet and a plurality of power generation panels coupled to each other by the sheet. In a first power generation panel and a second power generation panel adjacent to each other in the lateral direction, a third power generation panel adjacent to the first power generation panel in the longitudinal direction, and a fourth power generation panel adjacent to the second power generation panel in the longitudinal direction, included in the power generation panels, a first line is present between the first power generation panel and the second power generation panel, the first line crossing neither the first power generation panel nor the second power generation panel and coming in contact with both the first power generation panel and the second power generation panel; a first angle, which is the largest angle on the second power generation panel side, of angles formed by a second line and the first line is an acute angle; the second line being present on a bottom side of the first power generation panel and on a bottom side of the second power generation panel, crossing neither the first power generation panel nor the second power generation panel, and being in parallel in the lateral direction; the third power generation panel is disposed in line symmetry with the first power generation panel with respect to the lateral direction; and the fourth power generation panel is disposed in line symmetry with the second power generation panel with respect to the lateral direction. With this configuration, a power generation module group can be folded in a compact manner without forming a folding line on a sheet, which allows the power generation module group to have a superior portability and durability.

Here, in the disclosed power generation module group, preferably, the third power generation panel and the fourth power generation panel are adjacent to each other in the lateral direction; the second line is present on the top side of the third power generation panel and on the top side of the fourth power generation panel and crosses neither the third power generation panel nor the fourth power generation panel; a third line is present between the third power generation panel and the fourth power generation panel, the third line crossing neither the third power generation panel nor the fourth power generation panel and coming in contact with both the third power generation panel and the fourth power generation panel; and a second angle, which is the largest angle on the fourth power generation panel side, formed by the second line and the third line is an acute angle.

Further, in the disclosed power generation module group, the first angle and the second angle are preferably 80° or more and less than 90°. With such a configuration, an increase in the area in a plane occupied by the power generation panels can be prevented with the power generation module group put into a stored state, which allows the power generation module group to have a superior portability.

Further, in the disclosed power generation module group, preferably, the sheet has a through area in the center of the sheet on which the first power generation panel, the second power generation panel, the third power generation panel and the fourth power generation panel are disposed. With such a configuration, when the power generation module group 1 is folded, a load applied on the sheet can be reduced.

Further, in the disclosed power generation module group, preferably, the sheet includes wiring.

Advantageous Effect

According to the present disclosure, a power generation module group with a superior portability and durability can be provided.

DETAILED DESCRIPTION

Embodiments of the present disclosure will be described below with reference to drawings. It is to be noted that the present disclosure is not limited to the embodiments described below.

Figure 1:
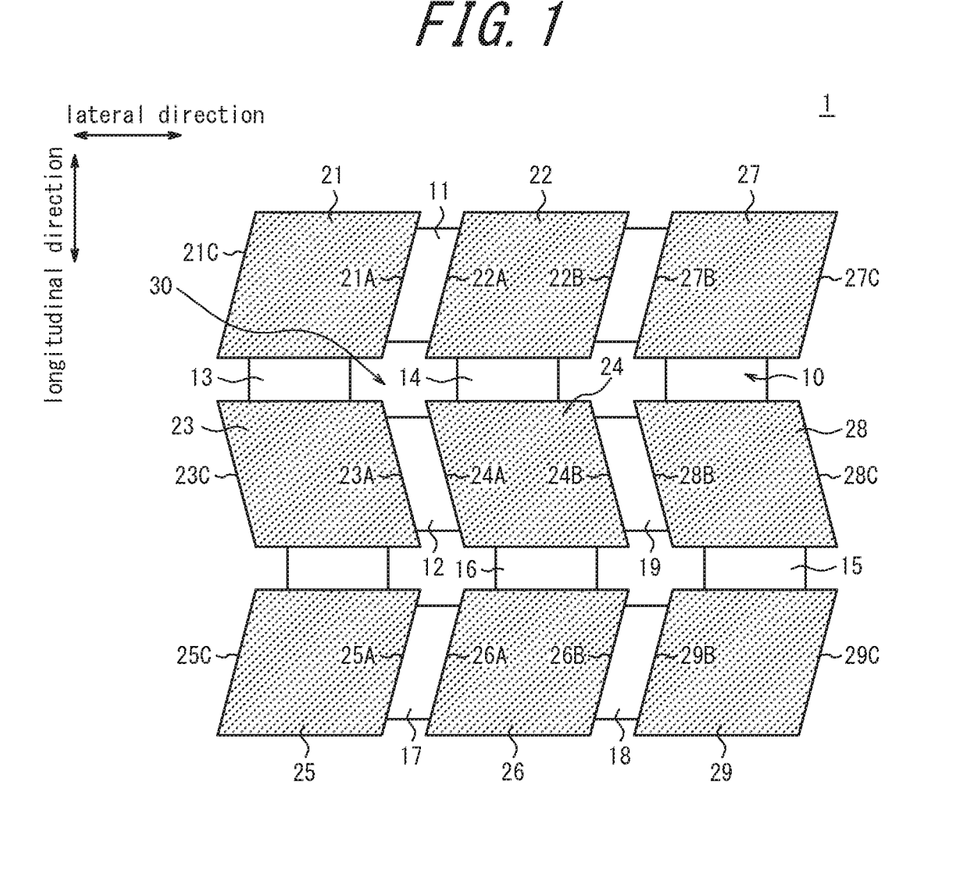
FIG. 1 is a top view of a power generation module group according to an embodiment of the present disclosure in use.
Figure 2:
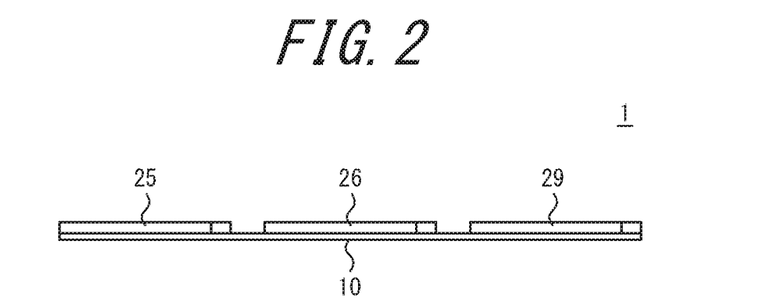
FIG. 2 is a front view of the power generation module group according to an embodiment of the present disclosure in use.

FIG. 1 is a top view of a power generation module group 1 according to an embodiment of the present disclosure in use and FIG. 2 is a front view of the power generation module group 1 according to an embodiment of the present disclosure in use. Here, "in use" is a state where the power generation module group 1 is spread flat such that power generation panels 21 to 29 are not overlapped with each other.

In this specification, the upper side means this side on the page of the top view illustrated in FIG. 1 and the like, and the lower side means the opposite side thereof. Further, in this specification, the lateral direction means the direction from the left to the right and from the right to the left on the page of the top view illustrated in FIG. 1 and the like. Moreover, the longitudinal direction means the direction from up to down and from down to up on the page of the top view illustrated in FIG. 1 and the like.

The power generation module group 1 is a sheet-like power generation module group used by the user to obtain power outside where a commercial power source cannot be obtained. The power generation module group 1 includes a sheet 10 and power generation panels 21, 22, 23, 24, 25, 26, 27, 28 and 29. It is to be noted that, in the example illustrated in FIG. 1, although the power generation module group 1 includes nine power generation panels 21 to 29, the number of the power generation panels included in the power generation module group 1 is not limited thereto, and it may be less than nine or ten or more. The power generation module group 1 according to the present embodiment is connected (attached) to a main body (not illustrated) of the power generation device and forms the power generation device with the main body. The power generation module group 1 supplies power generated by photoelectric conversion to the main body of the power generation device. In FIG. 1, a system that outputs power generated by the power generation module group 1 to the main body of the power generation device is not illustrated.

The sheet 10 is a flexible member. The sheet 10 may also be bendable. As illustrated in FIG. 2, when the sheet 10 is disposed under the power generation panels 21 to 29, each of the power generation panels 21 to 29 is mechanically coupled by the sheet 10. Further, the sheet 10 has a through area (e.g. a through area 30) in the center thereof where four power generation panels (e.g. the power generation panels 21 to 24) are disposed. It is to be noted that, in FIG. 1, although a rectangular through area 30 with 4 corners thereof notched out is illustrated, the shape of the through area 30 is not limited thereto, and it may be any shape such as circular, oval and polygonal. Moreover, a degree of stress focused on the sheet 10 can be reduced or dispersed by appropriately selecting the shape of the through area 30 according to the shape or the thickness of the power generation panels 21 to 29.

The sheet 10 also includes therein wiring (not illustrated) for electrically connecting each of the power generation panels 21 to 29 and wiring (not illustrated) extracting power generated by each of the power generation panels 21 to 29. The sheet 10 may be a layer structure that includes an upper layer on which the power generation panels 21 to 29 are disposed, a middle layer such as wiring and a lower layer disposed as a protection layer under the middle layer.

It is to be noted that, in the sheet 10, the portion located between the power generation panels 21 and 22, the portion located between the power generation panels 23 and 24 and the portion located between the power generation panels 21 and 23 are respectively referred to as a sheet portion 11, a sheet portion 12 and a sheet portion 13. Further, the portion located between the power generation panels 22 and 24, the portion located between the power generation panels 28 and 29 and the portion located between the power generation panels 24 and 26 are respectively referred to as a sheet portion 14, a sheet portion 15 and a sheet portion 16. Further, the portion located between the power generation panels 25 and 26, the portion located between the power generation panels 26 and 29 and the portion located between the power generation panels 24 and 28 are respectively referred to as a sheet portion 17, a sheet portion 18 and a sheet portion 19.

The power generation panels 21 to 29 are solar cell panels, for example, and have a high rigidity. The power generation panels 21 to 29 are approximate parallelograms, for example. It is to be noted that the power generation panels 21 to 29 are not limited to solar cell panels, and they may be power generation panels or other panels configured to generate power by using energy other than sunlight.

Further, in the power generation panels 21, 23 and 25 and the power generation panels 22, 24 and 26 disposed in the longitudinal direction, the sides 21A and 22A, the sides 23A and 24A and the sides 25A and 26A are respectively adjacent to each other in the lateral direction. Moreover, the sides 21A, 23A and 25A and the sides 22A, 24A and 26A are respectively disposed in an approximately zigzag manner along the longitudinal direction when viewed from above as illustrated in FIG. 1. Further, in the power generation panels 22, 24 and 26 and the power generation panels 27, 28 and 29 disposed in the longitudinal direction, the sides 22B and 27B, the sides 24B and 28B and the sides 26B and 29B are adjacent to each other in the lateral direction. Moreover, the sides 22B, 24B and 26B and the sides 27B, 28B and 29B are respectively disposed in an approximate zigzag manner in the longitudinal direction when viewed from above as illustrated in FIG. 1.

When the user uses the power generation module group 1, he/she puts the entire power generation module group 1 in a laid flat state, that is, in use state, such that the power generation panels 21 to 29 are not overlapped with each other. Further, when the user stores the power generation module group 1 without using it, he/she folds the power generation module group 1 along the longitudinal direction and the lateral direction such that the power generation panels 21 to 29 are put on top of each other (stored state). How the user operates when he/she puts the power generation module group 1 in use illustrated in FIG. 1 into a stored state is described below.

Figure 3:
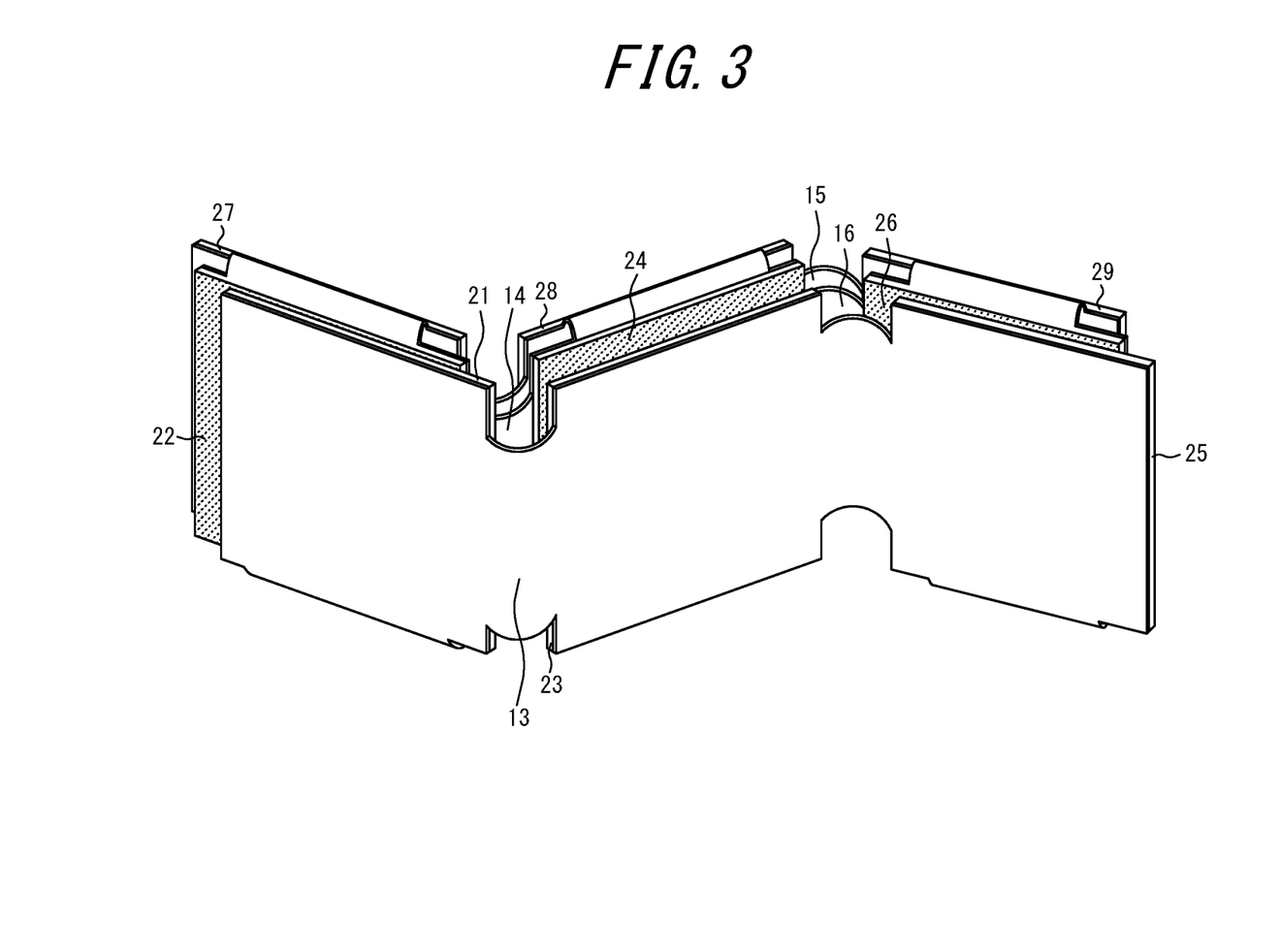
FIG. 3 is a perspective view of the power generation module group in FIG. 1 folded in the longitudinal direction.
Figure 4:
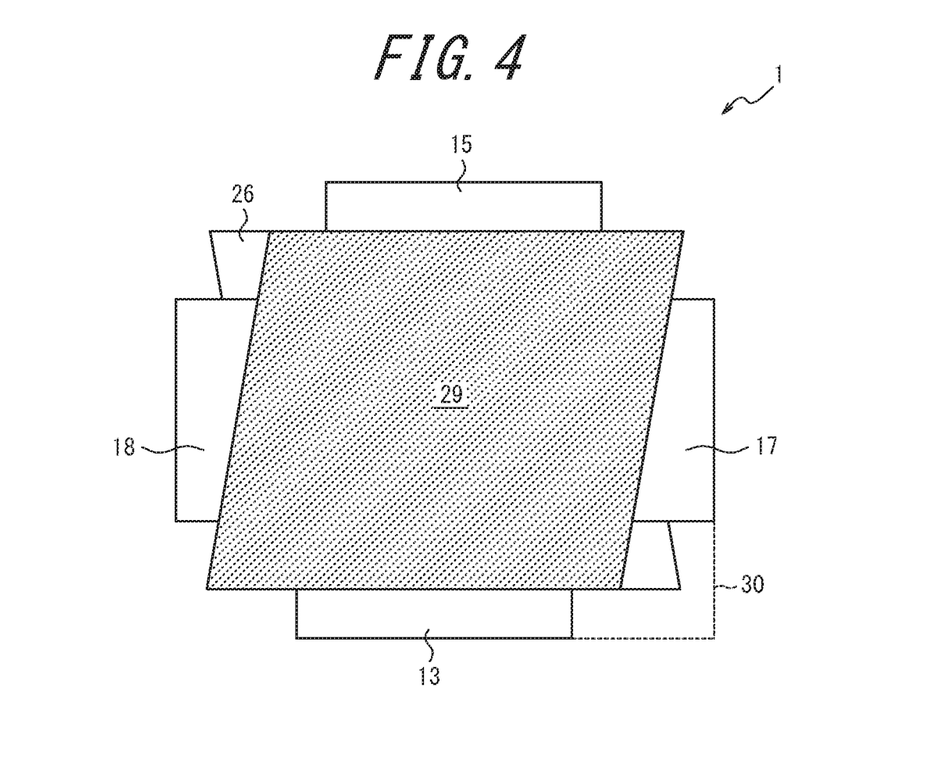
FIG. 4 is a top view of the power generation module group in FIG. 1 in a stored state.
Figure 5:
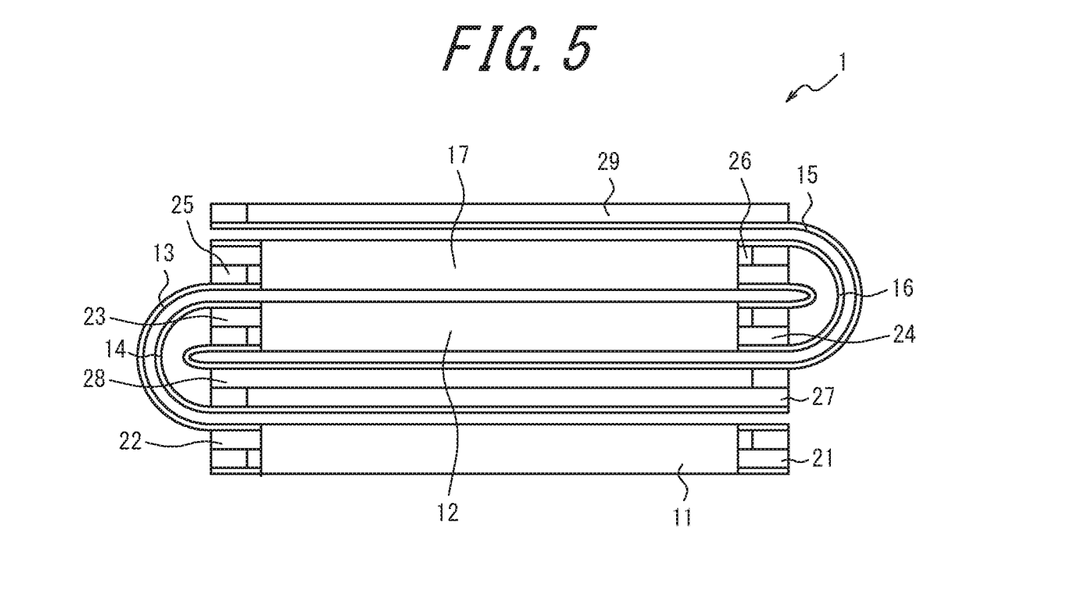
FIG. 5 is a front view of the power generation module group in FIG. 1 in a stored state.

First, the user holds either one of the sides 21C, 23C and 25C, for example, with his/her left hand and either one of the sides 27C, 28C and 29C with his/her right hand. Further, the user brings the sides 21C, 23C and 25C and the sides 27C, 28C and 29C close to each other along the lateral direction. Thus, for example, the sheets 11, 12 and 17 are bent in a valley shape and the sheets 18 and 19 are bent in a mountain shape, and as a result, the power generation module group 1 is folded along the longitudinal direction and formed into a bellows shape. FIG. 3 is a perspective view of the power generation module group 1 illustrated in FIG. 1 when it is folded in the longitudinal direction. Next, when the power generation module group 1 is in a bellows shape as illustrated in FIG. 3, the user contracts the bellows of the power generation module group 1 such that the power generation module group 1 is in a stored state. FIG. 4 illustrates a top view of the power generation module group 1 illustrated in FIG. 1 in a stored state, and FIG. 5 illustrates a front view of the power generation module group 1 illustrated in FIG. 1 in a stored state. Here, in the power generation module group 1 according to the present embodiment, due to the arrangement relation of the power generation panels 21 to 29, the power generation module group 1 is formed into a bellows shape, as illustrated in FIG. 3, when folded along the longitudinal direction. The arrangement relation of the power generation panels 21 to 29 will be described below.

Figure 6:
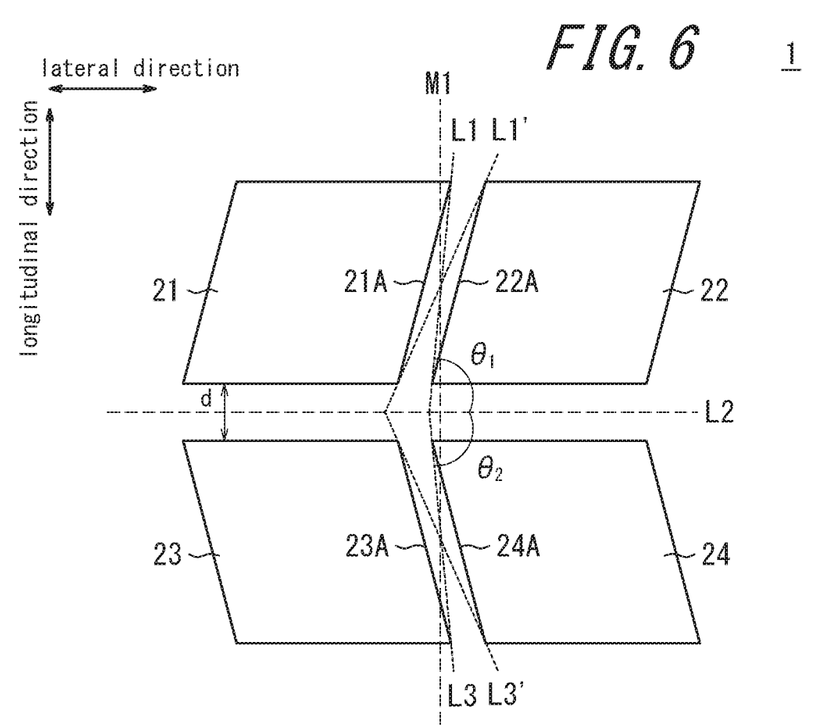
FIG. 6 is a top view illustrating an arrangement relation of power generation panels of the power generation module group illustrated in FIG. 1.

FIG. 6 is a top view for illustrating an arrangement relation of the power generation panels 21 to 29 of the power generation module group 1 illustrated in FIG. 1. In FIG. 6, only frames of the power generation panels 21 to 24 illustrated in FIG. 1 are illustrated for explanation, and the sheet 10 and the like are not illustrated.

It is to be noted that, in the present specification, the bottom side of the power generation panel means the lower side, on the page, of the portion where the power generation panel is illustrated in the top view in FIG. 6 or the like. Further, the top side of the power generation panel means the upper side, on the page, of the portion where the power generation panel is illustrated in the top view in FIG. 6 or the like.

First, the arrangement relation of the power generation panels adjacent to each other in the lateral direction will be described. The power generation panel (first power generation panel) 21 and the power generation panel (second power generation panel) 22 adjacent to each other in the lateral direction are taken as an example and explained below.

In the present disclosure, the first lines L1 and L1' are present between the power generation panel 21 and the power generation panel 22. The first lines L1 and L1' are lines crossing neither the power generation panels 21 nor 22 and coming in contact with both the power generation panels 21 and 22. Further, the second line L2 is a line being present on the bottom side of the power generation panel 21 and the bottom side of the power generation panel 22 and crossing neither the power generation panels 21 nor 22. In addition, the second line L2 is a line parallel in the lateral direction.

Here, an angle that is the largest angle formed on the power generation panel 22 side of angles formed by the first lines L1 and L1' and the second line L2 is referred to as a first angle θ1. In the example of FIG. 6, the first angle θ1 is formed by the first line L1 and the second line L2. In this case, the first angle θ1 is an acute angle (less than 90°).

Next, the arrangement relation of the power generation panels adjacent to each other in the longitudinal direction will be described.

The power generation panel (third power generation panel) 23 adjacent to the power generation panel 21 in the longitudinal direction is disposed in line symmetry with the power generation panel 21 with respect to the lateral direction. Further, the power generation panel (fourth power generation panel) 24 adjacent to the power generation panel 22 in the longitudinal direction is disposed in line symmetry with the power generation panel 22 with respect to the lateral direction. It is to be noted that, as long as the power generation panels 23 and 24 are respectively disposed in line symmetry with the power generation panels 21 and 22 with respect to the lateral direction, a distance d between the power generation panels 21 and 22 and the power generation panels 23 and 24 may be optionally determined.

In addition, as illustrated in FIG. 6, the arrangement relation of the power generation panels 23 and 24 when they are adjacent to each other in the lateral direction will be described below.

In the present disclosure, the third lines L3 and L3' are present between the power generation panels 23 and 24. The third lines L3 and L3' are lines crossing neither the power generation panels 23 nor 24 and coming in contact with both the power generation panels 23 and 24. Further, the second line L2 is a line being present on the top side of the power generation panel 23 and on the top side of the power generation panel 24 and crossing neither the power generation panels 23 nor 24.

Here, an angle that is the largest angle formed on the power generation panel 24 side of angles formed by the first lines L3 and L3' and the second line L2 is referred to as a second angle θ2. In the example of FIG. 6, the second angle θ2 is formed by the third line L3 and the second line L2. In this case, the second angle θ2 is an acute angle (less than 90°).

With such a configuration, a sheet portion 13 (see FIG. 1) or the like located between the power generation panels 21 and 23 is always bent in a predetermined shape each time the power generation module group 1 is folded along the longitudinal direction. This is illustrated in FIG. 7.

Figure 7:
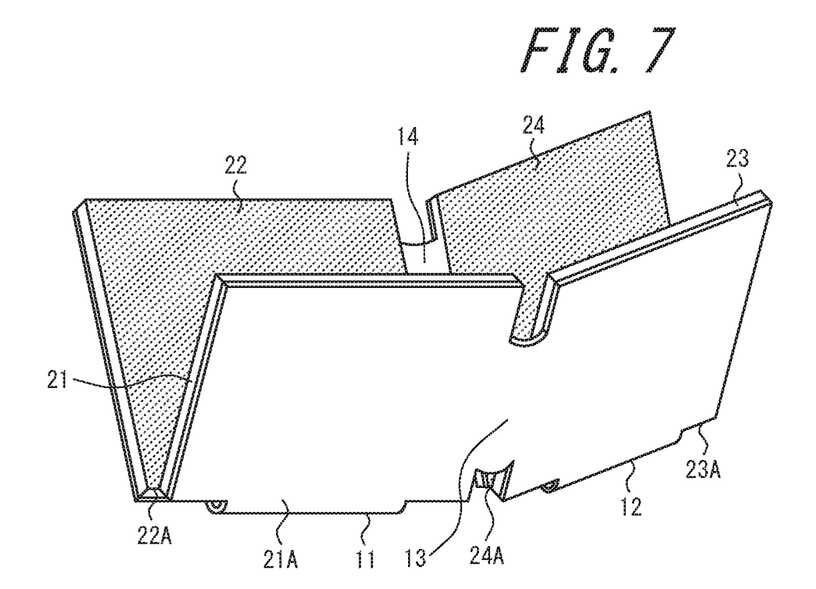
FIG. 7 is a perspective view of the power generation module group illustrated in FIG. 6 folded in the longitudinal direction.

FIG. 7 is a perspective view of the power generation module group 1 illustrated in FIG. 6 when folded in the longitudinal direction. As described above, in the power generation module group 1, the first angle θ1 and the second angle θ2 are acute angles in the power generation panels 21 and 22 adjacent to each other in the lateral direction or the like. As a result thereof, a line passing through between the sides 21A and 22A and being parallel in the longitudinal direction cannot be drawn without crossing the power generation panels 21 and 22 adjacent to each other in the lateral direction. In the same manner, a line passing through between the sides 23A and 24A and being parallel to the longitudinal direction cannot be drawn without crossing the power generation panels 23 and 24 adjacent to each other in the lateral direction. For example, a line M1 parallel in the longitudinal direction illustrated in FIG. 6, for example, crosses the sides 21A, 23A and the sides 22A, 24A. Thus, when the power generation module group 1 is folded along the longitudinal direction, the sheet portions 13 and 14 bend into a predetermined shape depending on the approximate zigzag shape which is along the longitudinal direction of the sides 21A, 23A and the sides 22A, 24A illustrated in FIG. 6. Thus the power generation module group 1 is formed into a bellows shape.

Comparative Example

Figure 8:
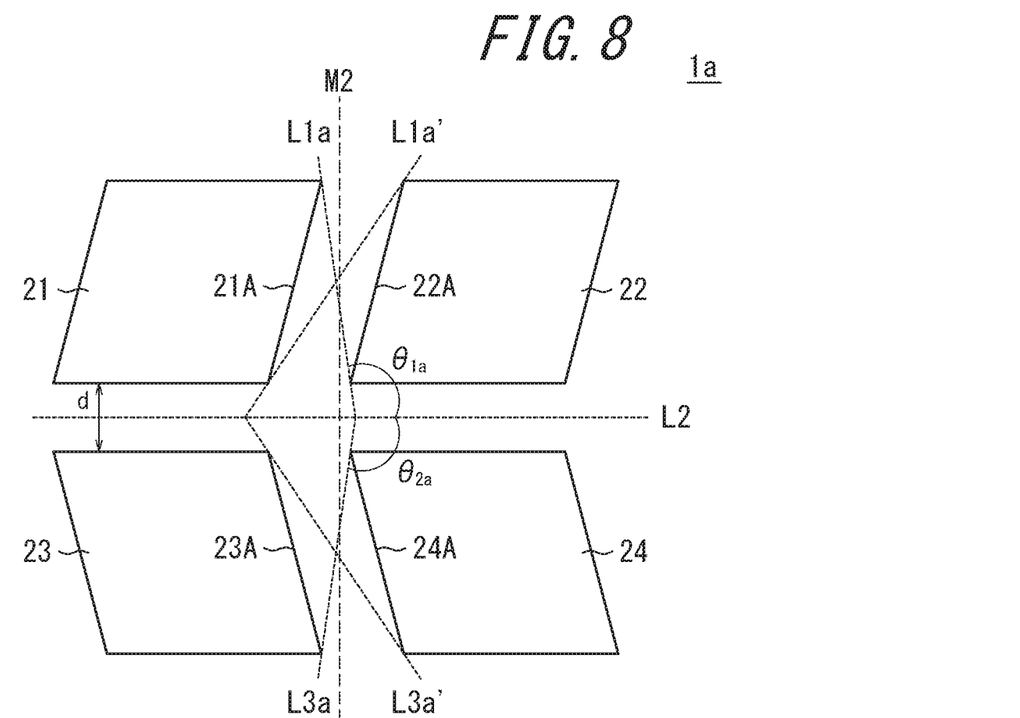
FIG. 8 is a top view illustrating an arrangement relation of a plurality of power generation panels of a power generation module group according to a comparative example.

FIG. 8 is a top view for illustrating an arrangement of a plurality of power generation panels of a power generation module group 1a according to a comparative example. It is to be noted that the same reference signs are assigned to the elements illustrated in FIG. 8 which are the same as those illustrated in FIG. 6, and explanation thereof is omitted.

The first lines L1a and L1a' are present between the power generation panels 21 and 22. The first lines L1a and L1a' cross neither the power generation panels 21 nor 22 and come in contact with both the power generation panels 21 and 22. Further, the second line L2 is a line being present on the bottom side of the power generation panel 21 and on the bottom side of the power generation panel 22 and crossing neither the power generation panels 21 nor 22. In addition, the second line L2 is a line parallel in the lateral direction.

Here, an angle that is the largest angle formed on the power generation panel 22 side of angles formed by the first lines L1a and L1a' and the second line L2 is referred to as a first angle θ1a. In the example of FIG. 8, the first angle θ1a is formed by the first line L1a and the second line L2. In this case, in the comparative example, the first angle θ1a is an obtuse angle (larger than) 90°.

The third lines L3a and L3a' are present between the power generation panels 23 and 24. The third lines L3a and L3a' are lines crossing neither the power generation panels 23 nor 24 and coming in contact with both the power generation panels 23 and 24.

Here, an angle that is the largest angle formed on the power generation panel 24 side of angles formed by the third lines L3a and L3a' and second line L2 is referred to as a second angle θ2a. In the example of FIG. 8, the second angle θ2a is formed by the third line L3a and the second line L2. In this case, in the comparative example, the second angle θ2a is an obtuse angle.

In the power generation module group 1a configured in the above described manner, as with the power generation module group 1 according to the present embodiment, the sheet portion located between the power generation panels 21 and 23 or the like does not bend in a predetermined shape even if it is folded along the longitudinal direction. This will be explained below.

Figure 9:
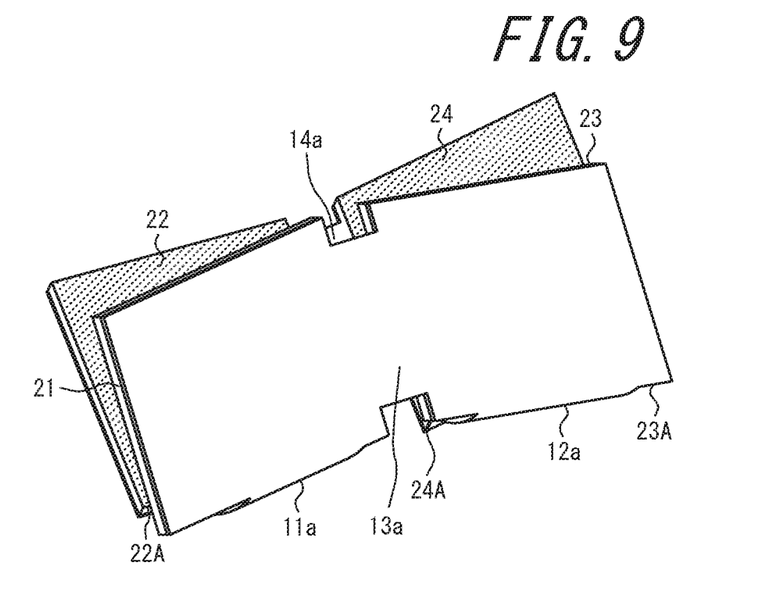
FIG. 9 is a perspective view of the power generation module group illustrated in FIG. 8 folded in the longitudinal direction.

FIG. 9 is a perspective view of the power generation module group 1a illustrated in FIG. 8 which is folded in the longitudinal direction. In the power generation module group 1a according to the comparative example, as described above, the first angle θ1a and the second angle θ2a are obtuse angles. This results in a line parallel to the longitudinal direction (e.g. the line M2 illustrated in FIG. 8), the line being present between the power generation panels 21 and 22 adjacent to each other in the lateral direction and crossing neither sides 21A and 23A nor sides 22A and 24A. Therefore, when the power generation module group 1a according to the comparative example is folded along the longitudinal direction, it is folded along the line (e.g. the line M2 illustrated in FIG. 8) without depending on the approximate zigzag shape along the longitudinal direction of the sides 21A and 23A and the sides 22A and 24A illustrated in FIG. 8. Thus, the power generation module group 1a according to the comparative example is not formed into a bellows shape even if it is folded along the longitudinal direction.

On the other hand, in the power generation module group 1 according to the present embodiment, the power generation panel 21 and the like are disposed such that the first angle θ1 and the second angle θ2 are acute angles. Thus, when the power generation module group 1 is folded along the longitudinal direction, the power generation module group 1 is formed into a bellows shape depending on the approximate zigzag shape along the longitudinal direction of the sides 21A and 23A and the sides 22A and 24A illustrated in FIG. 6.

It is to be noted that the first angle θ1 and the second angle θ2 will be an element for defining an area occupied by the power generation panel in a state where the power generation module group 1 is stored (see FIG. 4). For example, when the first angle θ1 and the second angle θ2 are respectively less than 80°, misalignment between the power generation panels increases with the power generation module group 1 put into a stored state, and the area in a plane occupied by the power generation panel increases. This is illustrated by using the top view in FIG. 4. When the first angle θ1 and the second angle θ2 are respectively less than 80°, misalignment between the power generation panel 26 and the power generation panel 29 increases, and the area in a plane occupied by the power generation panel 26 and the power generation panel 29 increases. Therefore, preferably, the first angle θ1 and the second angle θ2 are respectively 80° or more and less than 90°. Thus an increase in the area in a plane occupied by the power generation panel can be prevented with the power generation module group 1 put into a stored state, and the power generation module group 1 can have a superior portability.

Here, in some cases, the user can fold a power generation module group in various folding manners depending on the configuration of the sheet-like power generation module group. In this case, when the user folds a sheet-like power generation module group in a different folding manner each time he/she puts the power generation module group into a stored state, some portions may be folded into a mountain shape or into a valley shape each time the power generation module group is put into a stored state. Such a sheet portion tends to break easily when it is folded into a mountain shape and a valley shape repeatedly.

On the other hand, the power generation module group 1 according to the present embodiment is formed into the bellows shape illustrated in FIG. 3 depending on the approximate zigzag shape along the longitudinal direction such as the sides 21A, 23A and 25A and the sides 22A, 24A and 26A adjacent to each other illustrated in FIG. 1. Thus, in the power generation module group 1, the same sheet portion always bends into a predetermined shape (a mountain shape or a valley shape) each time the power generation module group 1 is folded into a bellows shape as illustrated in FIG. 3. For example, as illustrated in FIG. 3, the sheet portions 13 and 14 bend into a valley shape and the sheet portions 15 and 16 bend into a mountain shape. Therefore, the same sheet portion is bent into the same shape each time the bellows of the power generation module group 1 in the shape of bellows illustrated in FIG. 3 is contracted by the user such that the power generation module group 1 is put into a stored state illustrated in FIGS. 4 and 5. In other words, in the power generation module group 1, a sheet portion that will be in a mountain shape or a valley shape each time the power generation module group 1 is put into a stored state is less likely to occur. Thus, the durability of the power generation module group 1 is improved.

In this manner, in the power generation module group 1 according to the present embodiment, a folding line is not formed in the sheet 10 and the power generation panel 21 and the like are disposed such that the first angle θ1 and the second angle θ2 are acute angles. As a result, the power generation module group 1 can be folded in a compact manner. Thus the sheet 10 does not break due to a folding line formed in the sheet. Therefore, the portability and the durability of the power generation module group 1 are improved.

Moreover, in the power generation module group 1, a folding line is not formed in the sheet 10, which allows the sheet portion 13 and the like to bend in a stored state as illustrated in FIG. 5. Thus a load on wiring inside the sheet can be reduced and the durability of the power generation module group 1 is improved.

Further, in the power generation module group 1, as illustrated in FIG. 4, a through area 30 is provided at a position where the sheet portions are overlapped with each other in a stored state. Thus, in the power generation module group 1, a vertical bulge of the sheet 10 is reduced and compactness of the power generation module group 1 in a stored state can be enhanced, which allows the power generation module group 1 to have a superior portability. Moreover, when the through area 30 is provided at a portion where the sheet portions are overlapped with each other, a load on the sheet 10 due to overlapping of the sheet portions can be reduced, which prevents the sheet 10 from breaking.

It is to be noted that, in the present embodiment, as long as the power generation panels are disposed such that the first angle θ1 and the second angle θ2 are acute angles, a power generation panel of not only an approximate parallelogram but also of a variety of shapes can be adopted to the power generation module group 1. An example of the power generation panel that can be adopted to the power generation module group 1 according to the present embodiment will be illustrated below as a variation.

(Variation 1)

Figure 10:
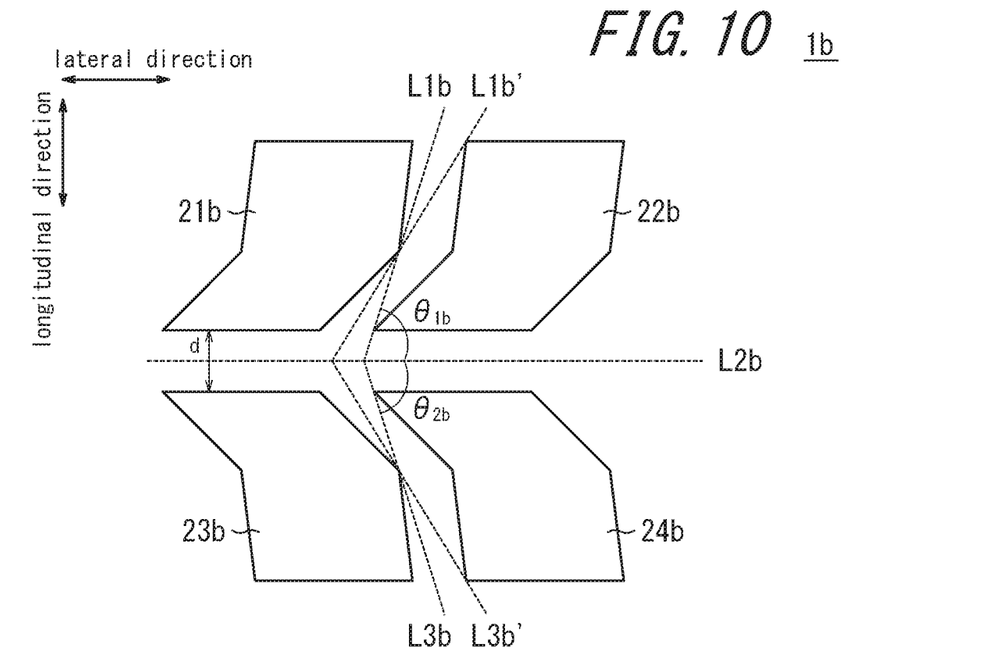
FIG. 10 is a top view illustrating an arrangement relation of power generation panels of a power generation module group according to Variation 1.

FIG. 10 is a top view illustrating an arrangement relation of power generation panels of a power generation module group 1b according to Variation 1. It is to be noted that, in the components illustrated in FIG. 10, the same reference signs are assigned to the components that are the same as those illustrated in FIG. 6, and the explanation thereof is omitted. Further, as with FIG. 6, the sheet 10 and the like are not illustrated in FIG. 10.

The power generation module group 1b includes power generation panels 21b and 22b adjacent to each other in the lateral direction and power generation panels 23b and 24b adjacent to each other in the lateral direction. Further, the power generation panel 23b is disposed such that it is adjacent to the power generation panel 21b in the longitudinal direction and it is in line symmetry with the power generation panel 21b with respect to the lateral direction. Further, the power generation panel 24b is disposed such that it is adjacent to the power generation panel 22b in the longitudinal direction and it is in line symmetry with the power generation panel 22b with respect to the lateral direction.

The arrangement relation of the power generation panels 21b to 24b according to Variation 1 is described below.

The first lines L1b and L1b' are present between the power generation panels 21b and 22b. The first lines L1b and L1b' are lines that cross neither the power generation panels 21b nor 22b and come in contact with both the power generation panels 21b and 22b. Further, the second line L2b is a line that is present on the bottom side of the power generation panel 21b and on the bottom side of the power generation panel 22b and crosses neither the power generation panels 21b nor 22b. In addition, the second line L2b is a line parallel in the lateral direction.

Here, the largest angle formed on the power generation panel 22b side of the angles formed by the first lines L1b and L1b' and the second line L2b is referred to as a first angle θ1b. In the example illustrated in FIG. 10, the first angle θ1b is formed by the first line L1b and the second line L2b. In this case, also in Variation 1, as with the present embodiment, the first angle θ1b is an acute angle (less than 90°).

The power generation panel 23b is disposed in line symmetry with the power generation panel 21b with respect to the lateral direction. Further, the power generation panel 24b is disposed in line symmetry with the power generation panel 22b with respect to the lateral direction. In addition, as illustrated in FIG. 10, the arrangement relation of the power generation panels 23b and 24b when they are adjacent to each other in the lateral direction will be described below.

The third lines L3b and L3b' are present between the power generation panels 23b and 24b. The third lines L3b and L3b' are lines crossing neither the power generation panels 23b nor 24b and coming in contact with both the power generation panels 23b and 24b. Further, the second line L2b is a line being present on the top side of the power generation panel 23b and on the top side of the power generation panel 24b and crossing neither the power generation panels 23b nor 24b.

Here, the largest angle formed on the power generation panel 24b side of the angles formed by the third lines L3b and L3b' and the second line L2b is referred to as a second angle θ2b. In the example illustrated in FIG. 10, the second angle θ2b is formed by the third line L3b and the second line L2b. In this case, also in Variation 1, as with the present embodiment, the second angle θ2b is an acute angle.

Even in the case of the power generation module group 1b that includes the power generation panels 21b to 24b, when the power generation panels 21b to 24b are disposed such that the first angle θ1b and the second angle θ2b are acute angles, the same effect as that obtained by the power generation module group 1 according to the present embodiment can be obtained.

(Variation 2)

Figure 11:
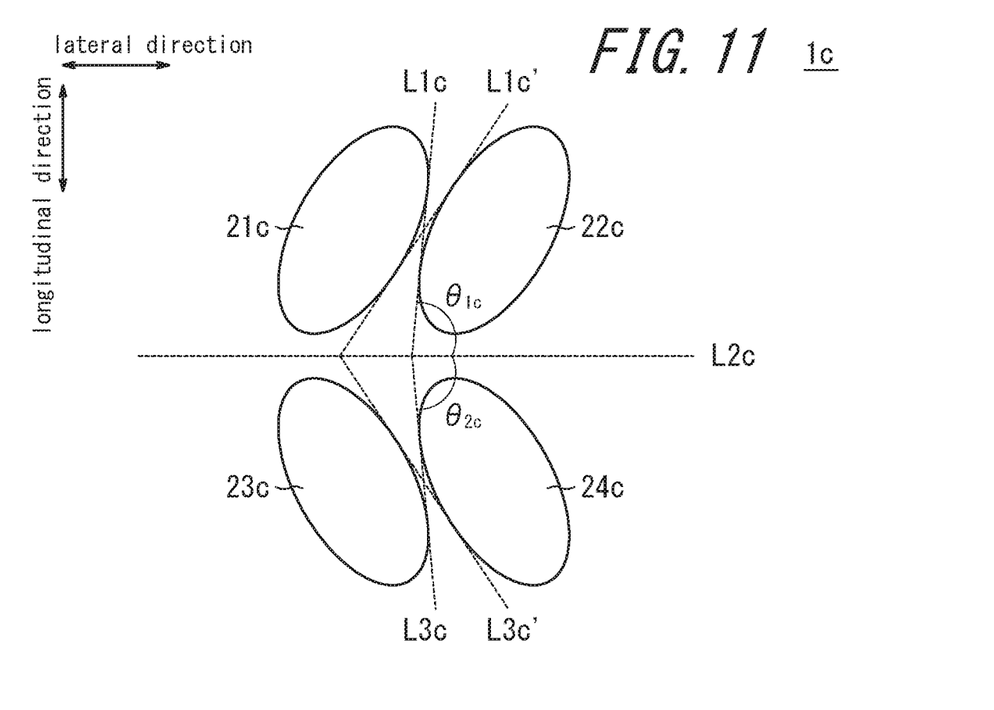
FIG. 11 is a top view illustrating an arrangement relation of power generation panels of a power generation module group according to Variation 2.

FIG. 11 is a top view illustrating an arrangement relation of power generation panels of a power generation module group 1c according to Variation 2. It is to be noted that, in the components illustrated in FIG. 11, the same reference signs are assigned to the components that are the same as those illustrated in FIG. 6, and the explanation thereof is omitted. Further, as with FIG. 6, the sheet 10 and the like are not illustrated also in FIG. 11.

The power generation module group 1c includes power generation panels 21c and 22c adjacent to each other in the lateral direction and power generation panels 23c and 24c adjacent to each other in the lateral direction. Further, the power generation panel 23c is disposed such that it is adjacent to the power generation panel 21c in the longitudinal direction and it is in line symmetry with the power generation panel 21c with respect to the lateral direction. Further, the power generation panel 24c is disposed such that it is adjacent to the power generation panel 22c in the longitudinal direction and it is in line symmetry with the power generation panel 22c with respect to the lateral direction. Further, the power generation panels 21c to 24c according to Variation 2 have an approximate oval shape.

The arrangement relation of the power generation panels 21c to 24b according to Variation 2 will be described below.

The first lines L1c and L1c' are present between the power generation panels 21c and 22c. The first lines L1c and L1c' are lines crossing neither the power generation panels 21c nor 22c and coming in contact with both the power generation panels 21c and 22c. Further, the second line L2c is a line being present on the bottom side of the power generation panel 21c and on the bottom side of the power generation panel 22c and crossing neither the power generation panels 21c nor 22c. In addition, the second line L2c is a line parallel in the lateral direction.

Here, the largest angle formed on the power generation panel 22c side of the angles formed by the first lines L1c and L1c' and the second line L2c is referred to as a first angle θ1c. In the example illustrated in FIG. 11, the first angle θ1c is formed by the first line L1c and the second line L2c. In this case, also in Variation 2, as with the present embodiment, the first angle θ1c is an acute angle (less than 90°).

The power generation panel 23c is disposed in line symmetry with the power generation panel 21c with respect to the lateral direction. Further, the power generation panel 24c is disposed in line symmetry with the power generation panel 22c with respect to the lateral direction. In addition, as illustrated in FIG. 11, the arrangement relation of the power generation panels 23c and 24c when they are adjacent to each other in the lateral direction will be described below.

The third lines L3c and L3c' are present between the power generation panels 23c and 24c. The third lines L3c and L3c' are lines crossing neither the power generation panels 23c nor 24c and coming in contact with both the power generation panels 23c and 24c. Further, the second line L2c is a line being present on the top side of the power generation panel 23c and on the top side of the power generation panel 24c and crossing neither the power generation panels 23c nor 24c.

Here, the largest angle formed on the power generation panel 24c side of the angles formed by the third lines L3c and L3c' and the second line L2c is referred to as a second angle θ2c. In the example illustrated in FIG. 11, the second angle θ2c is formed by the third line L3c and the second line L2c. In this case, also in Variation 2, as with the present embodiment, the second angle θ2c is an acute angle.

Even in the case of the power generation module group 1c that includes the power generation panels 21c to 24c of an approximate oval shape, when the power generation panels 21c to 24c are disposed such that the first angle θ1c and the second angle θ2c are acute angles, the same effect as that obtained by the power generation module group 1 according to the present embodiment can be obtained.

Although the present disclosure is described on the basis of the drawings and embodiments, it is to be noted that various changes and amendments could have been easily made by a person skilled in the art on the basis of the present disclosure. Therefore, it is to be noted that these changes or modifications are included in the scope of the present disclosure.

INDUSTRIAL APPLICABILITY

According to the present disclosure, a power generation module group that has a superior portability and durability can be provided.

REFERENCE SIGNS LIST 1, 1a, 1b, 1c Power generation module group
10 Sheet
11, 12, 13, 14, 15, 16, 17, 18, 19, 11a, 12a Sheet portion
21, 22, 23, 24, 25, 26, 27, 28, 29 Power generation panel
21b, 21c, 22b, 22c, 23b, 23c, 24b, 24c Power generation panel
21A, 22A, 23A, 24A, 25A, 26A Side
22B, 24B, 26B, 27B, 28B, 29B Side
30 Through area
L1, L1a, L1b, L1c First line
L2, L2b, L2c Second line
L3, L3a, L3b, L3c Third line
M1, M2 Line
d Distance

The invention claimed is:

1. A foldable mobile power generation module group comprising:
a flexible sheet and each of a plurality of power generation panels disposed on the flexible sheet, wherein,
the plurality of power generation panels include a first power generation panel, a second power generation panel, a third power generation panel, and a fourth power generation panel,
the first power generation panel and the second power generation panel are disposed adjacent to each other in a lateral direction,
the third power generation panel and the fourth power generation panel are disposed adjacent to each other in the lateral direction,
the third power generation panel is disposed adjacent to the first power generation panel in a longitudinal direction and is in line symmetry with the first power generation panel with respect to the lateral direction,
the fourth power generation panel is disposed adjacent to the second power generation panel in the longitudinal direction and is in line symmetry with the second power generation panel with respect to the lateral direction,
a plurality of first straight lines can be drawn from an edge of the first power generation panel to an edge of the second power generation panel such that the plurality of first straight lines do not cross an interior of the first power generation panel nor an interior of the second power generation panel, even if the plurality of first straight lines were extended at both ends;
a second straight line can be drawn in the lateral direction, in a gap between the first power generation panel and the third power generation panel and a gap between the second power generation panel and the fourth power generation panel;
the plurality of first straight lines and the second straight line intersect to form a plurality of first angles on a side of the first power generation panel facing the second power generation panel, wherein an angle of a largest angle among the plurality of first angles is an acute angle;
a plurality of third straight lines can be drawn from an edge of the third power generation panel to an edge of the fourth power generation panel, such that the plurality of third straight lines do not cross the interior of the third power generation panel nor the interior of the fourth power generation panel, even if the plurality of third straight lines were extended at both ends;
the plurality of third straight lines and the second straight line intersect to form a plurality of second angles on a side of the third power generation panel facing the fourth power generation panel, wherein an angle of a largest angle among the plurality of second angles is an acute angle;
on the flexible sheet, a length of each portion of the flexible sheet coming in contact with each side of the plurality of power generation panels is shorter than a length of each side of the plurality of power generation panels, each portion of the flexible sheet being located between any two of the plurality of power generation panels which are adjacent to each other;

the largest angle among the plurality of first angles is larger than a smallest angle among internal angles of the plurality of power generation panels;

the largest angle among the plurality of second angles is larger than the smallest angle among the internal angles of the plurality of power generation panels; and wherein the plurality of first straight lines reside in a first area, the plurality of third straight lines reside in a second area, and a first direction of the first area extending in the longitudinal direction is not coincident with a second direction of the second area extending in the longitudinal direction.

2. The foldable mobile power generation module group according to claim 1, wherein the largest angle among the plurality of first angles and the largest angle among the plurality of second angles are 80° or more and less than 90°.

3. The foldable mobile power generation module group according to claim 1, wherein the flexible sheet includes wiring.

4. The foldable mobile power generation module group according to claim 2, wherein the flexible sheet includes wiring.

5. The foldable mobile power generation module group according to claim 1, wherein the flexible sheet is a flat sheet and each portion of the flexible sheet is part of the flat sheet shaped for satisfying following relation:

the width of the flexible sheet between any of the plurality of power generation panels connected by the flexible sheet is shorter than lengths of each sides of the plurality of power generation panels connected by the flexible sheet.

6. The foldable mobile power generation module group according to claim 1, wherein the flexible sheet is a single layer.

7. The foldable mobile power generation module group according to claim 1, wherein each of the plurality of power generation panels is coupled to a top of the flexible sheet; and each portion of the flexible sheet has a shorter thickness than a combination of the thickness of the each of the plurality of power generation panels and the thickness of the flexible sheet to which they are coupled.

8. The foldable mobile power generation module group according to claim 1, wherein the flexible sheet is free from folding lines.

9. The foldable mobile power generation module group according to claim 1, wherein the flexible sheet has a through area in a center of a sheet portion where the first power generation panel, the second power generation panel, the third power generation panel and the fourth power generation panel are disposed.

* * * * *